United States Patent Office 3,072,460
Patented Jan. 8, 1963

3,072,460
LIQUID PHOSPHORIC ACID COMPOSITIONS
Donald C. Young, Fullerton, and Peter Stanley Backlund and Kenneth Weldon Fort, Anaheim, Calif., assignors, by mesne assignments, to Collier Carbon and Chemical Corporation, a corporation of California
No Drawing. Filed Nov. 23, 1959, Ser. No. 854,542
6 Claims. (Cl. 23—165)

This invention relates to the shipping, storing, handling and use of concentrated phosphoric acid, and in particular relates to a novel concentrated phosphoric acid composition having low corrosivity, low viscosity and a low solidification temperature, useful in many varied applications, such as gas drying, metal pickling, fertilizer manufacture, etc.

The shipping, storing and handling of phosphoric acid is troublesome, because of its high corrosivity, viscosity and freezing point. It has long been known that concentrated phosphoric acid with a $P_2O_5$ content between about 67 and 74 weight percent is non-corrosive to ordinary carbon steel. However, such acid is a solid at ambient temperature. For this reason, manufacturers and users of phosphoric acid have preferred to handle the acid in dilute form even though this necessitates the shipping and storing of large quantities of water and the use of expensive corrosion-resistant containers. One recommended type of storage tank for the dilute acid, for example, comprises a concrete shell lined with several layers of asphalt and tar paper, then lead, and finally acid-proof masonry.

It is a purpose of this invention to obviate the need for the special corrosion precautions heretofore required and permit handling of the acid in the liquid state at most ambient temperatures by providing novel concentrated phosphoric acid compositions having low freezing points, low viscosities, and being substantially non-corrosive.

The compositions of the invention comprise a mixture of phosphoric acid containing between about 67 and about 74 weight percent of $P_2O_5$ on an impurity-free basis and an organic amide. The latter is provided in such amounts that the composition contains between about 0.1 and 2.5 weight percent nitrogen added in the form of an organic amide or substituted amide. The presence of the amide in the phosphoric acid substantially reduces the freezing point of the acid to below 30° F. or 40° F., without imparting corrosivity to the acid. In addition, the amides have the surprising and highly beneficial effect of also reducing the viscosity of phosphoric acid, so that by the addition of a single additive in relatively slight amounts, a non-corrosive, low viscosity, low freezing point phosphoric acid is produced.

The phosphoric acid component of the present compositions may be either the so-called "wet-process," acid, which is obtained by leaching phosphate rock with sulfuric acid and thereafter filtering off the precipitated calcium sulfate, or the so-called "white acid," which is obtained by the thermal reduction of phosphate rock.

Amides and substituted amides having the following general formula are suitable for use in the invention:

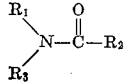

where the total of the carbon atoms in the $R_1$, $R_2$ and $R_3$ groups does not exceed about 10; $R_1$ and $R_3$ are each selected from the group consisting of hydrogen, alkyl and phenyl radicals; and $R_2$ is one of the following radicals:

Amino and substituted amino, e.g., urea and mono- and symmetrical and unsymmetrical di-alkyl, and phenyl substituted derivatives thereof, such as N-N-dimethyl urea, N-N'-dimethyl urea, tetraethyl urea, trimethyl urea, etc.;

Hydrogen, e.g., formamide and various N-mono- and N,N-dialkyl, and phenyl substituted formamides, such as N-ethyl- and N,N-dimethyl formamide, N-phenyl formamide, N-propyl formamide, etc.;

Phenyl, e.g., benzamide and N-mono- and N,N-dialkyl substituted derivatives thereof, such as N-methyl benzamide, N,N-methyl propyl benzamide, etc.;

Methyl, e.g., acetamide and N-mono- and N,N-dialkyl and phenyl substituted derivatives thereof, such as N-phenyl acetamide, N,N-dipropyl acetamide, etc.;

Ethyl, e.g., propionamide, and N-mono- and N,N-dialkyl and phenyl substituted derivatives thereof, such as N,N-dimethyl propionamide, N-phenyl propionamide, N-butyl propionamide, etc.;

Propyl, e.g., normal and iso-butyramide and N-mono- and N,N-dialkyl, and phenyl substituted derivatives thereof, such as N-ethyl-isobutyramide, N,N-dimethyl-n-butyramide, etc.;

Butyl, e.g., normal and iso-valeric amide and N-mono- and N,N-dialkyl and phenyl substituted derivatives thereof, such as N,N-dimethyl-isovaleric amide, N-phenyl-n-valeric amide, etc.;

Amyl, e.g., normal and iso-caproic amide and N-mono- and N,N-dialkyl substituted derivatives thereof, such as N-methyl-n-caproic amide, N,N-diethyl-isocaproic amide, etc.;

Hexyl, e.g., normal and iso-heptanoic amide and N-mono- and N,N-dialkyl substituted derivatives thereof, such as N,N-diethyl-isoheptanoic amide, N-propylene-n-heptanoic amide, etc.;

Heptyl, e.g., normal and- isocaprylic amide and N-mono- and N,N-dialkyl substituted derivatives thereof;

Octyl, e.g., normal and iso-pelargonic amide and N-mono- and N,N-dialkyl substituted derivatives thereof;

Nonyl, e.g., normal and iso-capric amide and N-mono- and N,N-dialkyl substituted derivatives thereof;

Decyl, e.g., normal and iso-undecyclic amide.

The following examples will serve to illustrate the invention:

EXAMPLE 1

The effect of amides on concentrated phosphoric acid was investigated by the addition of 5 weight percent formamide and 5 weight percent dimethyl formamide to separate samples of phosphoric acid. The phosphoric acid was a concentrated "wet-process" acid with a laboratory analysis of 69 weight percent $P_2O_5$, a viscosity of 3700 centipoises at 80° F., a negligible corrosion rate and a freezing point greater than 70° F. The results of the test appear in the following table:

Table 1

| Sample Description | Additive (Weight percent) | Viscosity at 80° F. (Centipoises) | Freezing Point, ° F. | Corrosion Rate (m.p.y. at 125° F.) |
|---|---|---|---|---|
| Acid | None | 3,700 | >70 | Nil. |
| Acid+Amide | 5.0 Formamide | 4,560 | <30 | Nil. |
| Acid+Amide | 5.0 dimethyl Formamide. | 1,550 | <30 | Nil. |

EXAMPLE 2

To test lower concentrations of amides, formamide and dimethyl formamide were added in concentrations of 0.5 weight percent to separate samples of a second phosphoric acid. This concentrated "wet-process" acid had a laboratory analysis of 69 weight percent $P_2O_5$, a viscosity of 2000 centipoises at 80° F., a negligible corrosion rate and a freezing point greater than 70° F.

The results appear in the following table:

Table 2

| Sample Description | Additive (Weight percent) | Viscosity (Centipoises at 80° F.) | Freezing Point, °F. |
|---|---|---|---|
| Acid | None | 2,000 | >70 |
| Acid+Formamide | 0.5 | 1,600 | <40 |
| Acid+Dimethyl Formamide | 0.5 | 1,600 | <50 |

From these examples it can be seen that the use of amides in concentrations as low as 0.5 weight percent substantially reduces the viscosity and the freezing point of phosphoric acid. To depress the freezing point of the acid below about 30° F., concentrations of amides up to about 5 weight percent are necessary. At the high concentration of formamide the acid composition exhibited the anomalous behavior of increasing the acid viscosity. This behavior is believed due to hydrolysis of the amide in the acid and, accordingly, it is preferred to employ substituted amides which will not hydrolyze in the acid composition.

The preceding examples are solely for illustration and are not to be considered as limiting the invention which comprises all compositions of phosphoric acid having a concentration expressed as P₂O₅ on an impurity and additive-free basis between about 67 and 74 weight percent and containing amide compounds having less than about 11 total carbon atoms.

Having completely disclosed and illustrated our invention, we claim:

1. A phosphoric acid composition having an acid concentration expressed as P₂O₅ on an impurity and additive-free basis between 67 and 74 weight percent and containing between about 0.01 and 2.5 weight percent nitrogen in the form of an amide having the formula of:

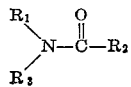

where $R_1$ and $R_3$ are each selected from the group consisting of hydrogen, alkyl and phenyl radicals, $R_2$ is selected from the group consisting of hydrogen, alkyl, phenyl and amino radicals, and the total of the carbon atoms in the $R_1$, $R_2$ and $R_3$ groups does not exceed about 10.

2. The composition of claim 1 wherein said amide is formamide.

3. The composition of claim 1 wherein said amide is dimethyl formamide.

4. The compositon of claim 1 wherein said phosphoric acid is a wet process phosphoric acid.

5. The phosphoric acid of claim 1 wherein said amide is urea.

6. A phosphoric acid composition having an acid concentration expressed as P₂O₅ on an impurity and additive free basis between about 67 and 74 weight percent and having a sufficient quantity of nitrogen in the form of an amide to depress its freezing point to at least about 40° Fahrenheit, said amide having the formula of:

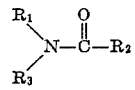

where $R_1$ and $R_3$ are each selected from the group consisting of hydrogen, alkyl and phenyl radicals, $R_2$ is selected from the group consisting of hydrogen, alkyl, phenyl and amino radicals, and the total of the carbon atoms in the $R_1$, $R_2$ and $R_3$ groups does not exceed about 10.

References Cited in the file of this patent

UNITED STATES PATENTS

| 2,258,578 | Chesley | Oct. 7, 1941 |
| 2,423,343 | Plueddemann | July 1, 1947 |
| 2,567,156 | Malowan | Sept. 4, 1951 |
| 2,770,538 | Vierling | Nov. 13, 1956 |
| 2,869,998 | Vierling | Jan. 20, 1959 |